(No Model.) 2 Sheets—Sheet 1.
E. THOMSON.
ELECTRIC MEASURING INSTRUMENT.
No. 542,663. Patented July 16, 1895.
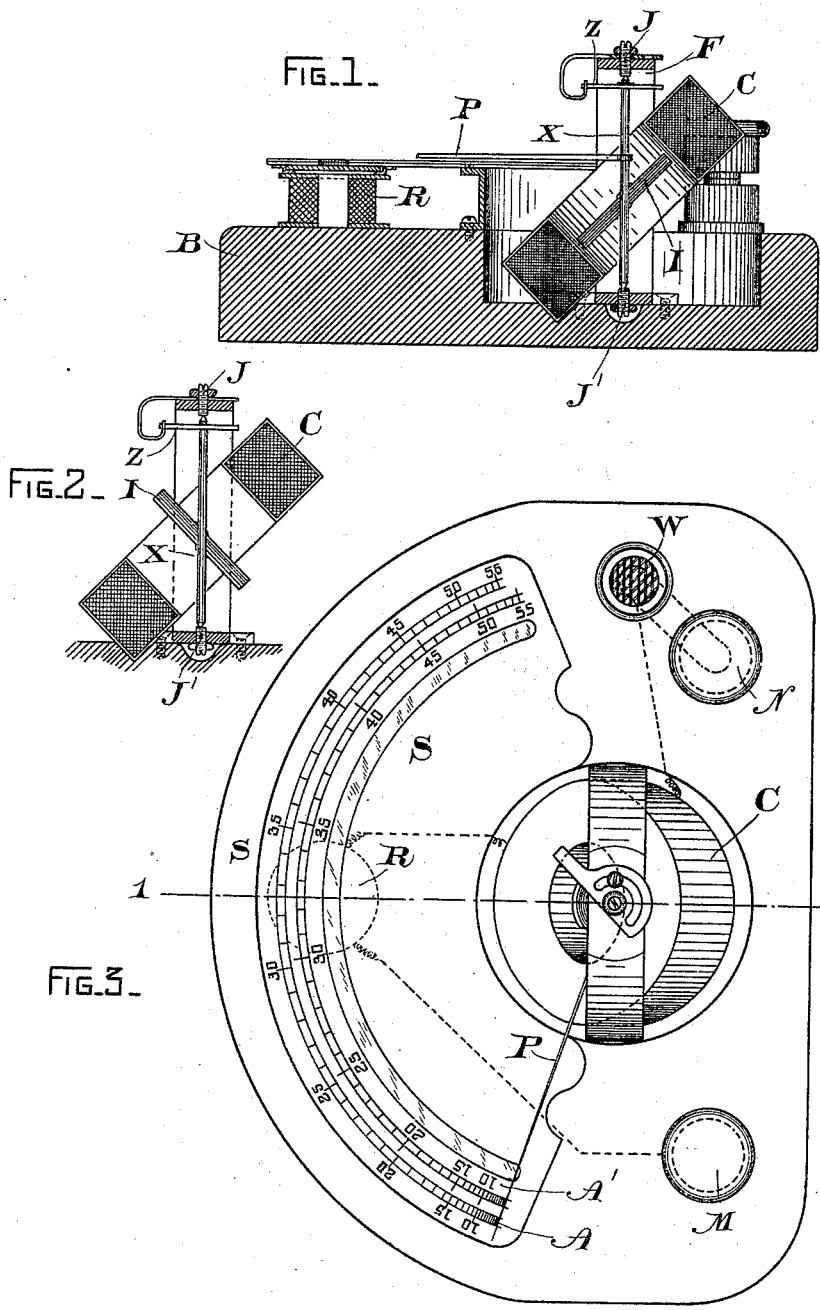
WITNESSES
Henry O. Westendarf
B. B. Hull
INVENTOR
Elihu Thomson, by
Geo. R. Blodgett.
Atty.

(No Model.) 2 Sheets—Sheet 2.
E. THOMSON.
ELECTRIC MEASURING INSTRUMENT.
No. 542,663. Patented July 16, 1895.
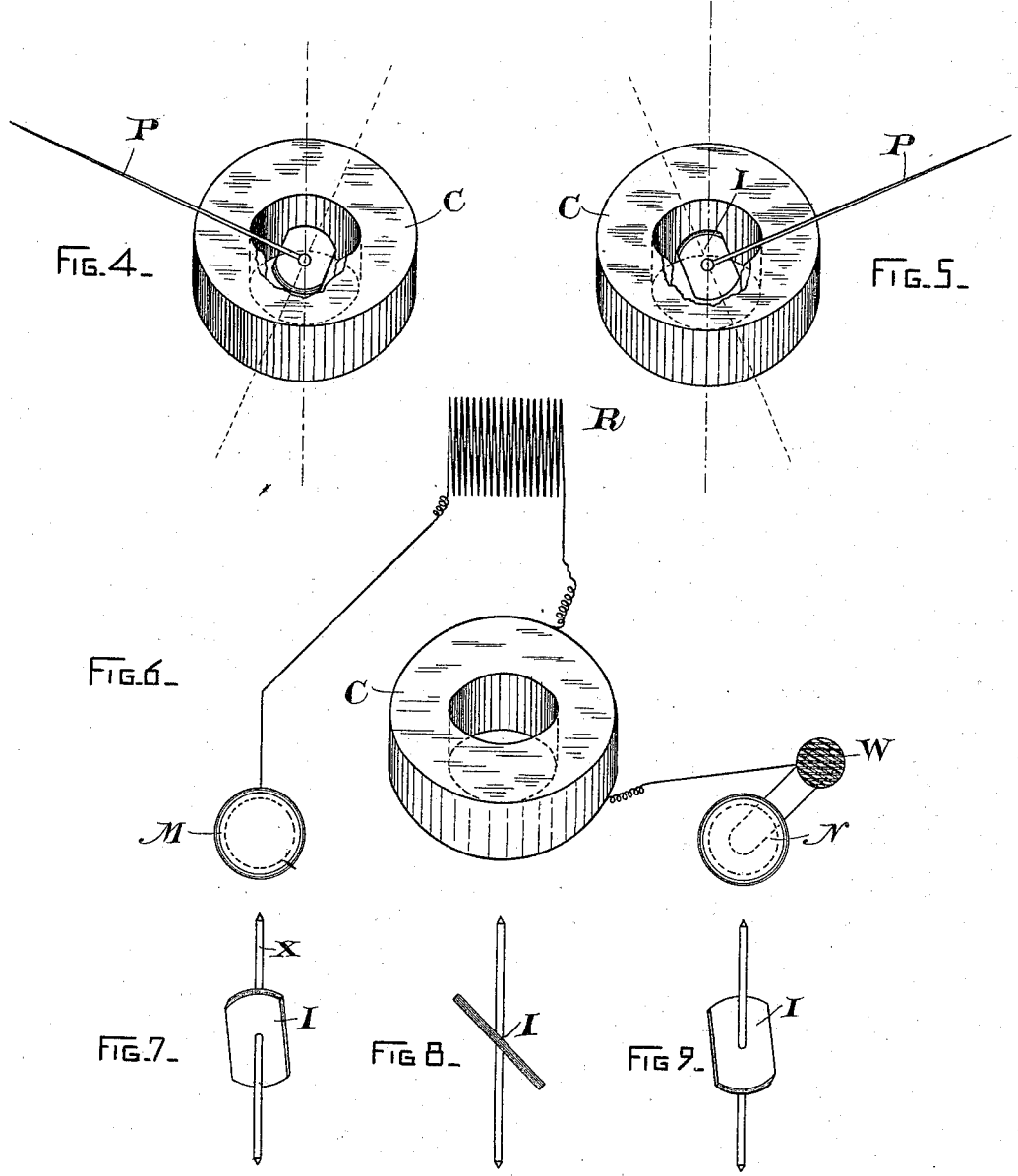
WITNESSES
Henry Westendarp
B. B. Hull.
INVENTOR
Elihu Thomson,
Geo. R. Blodgett,
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRIC MEASURING-INSTRUMENT.

SPECIFICATION forming part of Letters Patent No. 542,663, dated July 16, 1895.

Application filed April 25, 1895. Serial No. 547,125. (No model.)

*To all whom it may concern:*

Be it known that I, ELIHU THOMSON, a citizen of the United States, residing at Swampscott, county of Essex, in the State of Massachusetts, have invented certain new and useful Improvements in Electric Measuring-Instruments, of which the following is a specification.

My present invention relates to electrical measuring-instruments; and has for its object to produce an instrument particularly adapted for the measurement of alternating currents, which shall be simple, easy, and cheap to construct, and also reliable in its indications. The instrument when properly constructed may be adapted to the measurement of continuous currents within fair approximations, as the hysteresis error is small.

My invention secures with great simplicity of parts practically the minimum of inertia in the moving parts and a scale covering from one hundred and forty degrees to one hundred and fifty degrees.

The instrument is adapted by variations of its winding and connections to be used as either a voltmeter or ammeter. When it is used as a voltmeter, the coils of the instrument are connected in series with a high resistance, while used as an ammeter the coils are wound of wire of such a gage as will carry the current without undue resistance.

My invention will be understood by reference to the accompanying drawings, in which—

Figure 1 is a vertical section upon the line 1 1 of Fig. 3; Fig. 2, a section of a portion of the instrument with the indicator and shaft turned into another position. Fig. 3 is a front or face view showing the scale and the parts in place with the cover removed. Figs. 4, 5, 7, 8, and 9 relate to details of arrangement and adjustment, and Fig. 6 is a diagram of the circuits.

In Fig. 1, B B is a base of hard wood or other suitable material. Mounted upon this base is a frame F, which supports a coil of insulated wire C. The frame carries bearings or jewels J J', in which moves a light shaft, upon which is mounted an inclined plate I of magnetizable material, the plane of the coil C being at an angle with the axis of the shaft X, as is also the plane of the iron or magnetizable piece I. The angle of the coil C may be as much as forty-five degrees to fifty degrees with the axis, and the plane of the iron piece I may likewise be at an angle of thirty degrees to forty-five degrees with the axis. This angular position, in each instance, may be considerably departed from if suitable adjustments are made. The shaft X, Fig. 1, carries a light aluminum pointer or indicator-arm P, which moves over a scale shown at S S, Fig. 3. In Fig. 3 the coil is seen in its inclined position, and in dotted lines circuit connections are indicated from the binding-post M through to post N. These connections in the case of a voltmeter preferably include a high-resistance coil R, made of some very fine wire, wound non-inductively, and the temperature coefficient of which wire is either very slight or entirely negligible. The coil C is made of some metal, like copper, its turns being well insulated, and a circuit-opening switch, as usual in such instruments, may be provided at W. I also prefer to use a spring-control in the instrument, as indicated at Z, which represents an edge view of a spiral spring, like the hair-spring of a watch. This spring could, of course, in the case of an instrument permanently placed with the axis horizontal, be replaced by gravity control, but the spring is to be preferred.

The magnetizable body I may be made of a single thin sheet of iron or two or three thin sheets laid over each other and perforated for the passage of the shaft X, to which they are secured. In Fig. 7 the relative positions are approximately indicated, as also the preferred sizes and shapes relatively.

Fig. 7 is a view looking toward the face of the piece I; Fig. 8, a view looking on the edge, and Fig. 9, looking toward the other face of the piece I opposite to that in Fig. 7.

In Fig. 5 the mounting is shown with portions of the coil C cut away to show the relative positions taken by the piece I. The adjustment of the spring control in such that the pointer P may be, for instance, on zero in Fig. 4, in which case the little plate of iron in angular position will stand relatively to the coil about as shown in that figure, the lower edge of the piece I being the edge nearest the observer, while the upper edge in the figure is farthest removed. In Fig. 5 the index has moved to the other extreme of the scale from zero to the highest figure. The upper edge is now nearest the observer, while the lower edge is farthest away. This will show that the iron piece has rotated through as large an angle as one hundred and fifty degrees. Theoretically the limit would be one hundred and eighty degrees, but practically this theoretical scale cannot be reached, though it may be approximated.

The turning moment or turning force is developed by the tendency of the piece I, which when at rest would be in the position, Fig. 1, to turn into the position, Fig. 2. In Fig. 1 the iron or magnetizable metal has its plane in the plane of the coil. In Fig. 2 this plane is at right angles to the plane of the coil, and while these figures would not be exact, yet the actions that occur are substantially as indicated, inasmuch as the piece I at the zero position is slightly out of the plane of the coil, and as the index moves the piece I turns from this position gradually more and more out of the plane of the coil until finally its position is nearly in the axis or at right angles to the plane of the coil.

Fig. 6 simply shows the circuit itself stripped of all extraneous parts when the instrument is used as a voltmeter. If, however, the instrument were used as an ammeter, the resistance R could be dispensed with. The circuit-closing switch W may be dispensed with, and the coil C is then wound with a sufficient section of conductor and with the proper number of turns to make it an ammeter. If the current to be measured is large, then there are few turns and the section per turn is greater, while if the current to be measured is small the turns are more in number and the section of each turn is smaller.

In using the instrument for alternating-current measurements there would at times be slight differences in the scale-readings due to changes in the frequency of alternation. To compensate for this I calibrate the instrument and mark upon it a scale which is the correct scale for a certain frequency, and I may then calibrate it again for a different frequency and mark thereon a scale which is correct for that frequency.

If the instrument is to read for several frequencies, the several scales may be placed thereon and marked for each frequency. Thus, scale A in Fig. 3 may be 125 frequency and scale A' 60 frequency, these being commercial frequencies at the present time.

What I claim as new, and desire to secure by Letters Patent of the United States, is—

1. In an electric measuring instrument, a coil or conductor traversed by the current to be measured, placed in an inclined or angular position with respect to the shaft carrying the indicator, and a bar or plate of magnetizable materal carried on said shaft also at an angle with said axis, with means for bringing the indicator to zero when no current passes.

2. In an electric measuring instrument, an angularly mounted coil through the open interior of which passes a shaft forming an angle with the coil or conductor, a magnetizable body or plate mounted on the shaft at an angle thereto, an indicator and scale for reading the movements of the axis and magnetizable body within the coil, and means for controlling the return of the instrument to zero and opposing the movements of the magnetizable body under the action of the currents in the coil.

3. In an electric measuring instrument, a coil or conductor traversed by the current to be measured, in the open space of which is mounted a rotatable shaft at an angle with the plane of the coil or conductor, an indicator carried on said shaft, and a plate of magnetizable material, such as iron, mounted on the shaft with its plane at an angle thereto, the parts arranged and adjusted so that when the index of the instrument is at zero the plane of the magnetizable body is more nearly coincident with the plane of the coil than when the indicator has moved away from the zero position of the scale in registering current, while the plane of the magnetizable body is more nearly at right angles with the plane of the coil at the higher readings of the scale.

4. In an electrical instrument, a frame supporting a shaft, a coil or conductor surrounding said shaft with its plane at an angle thereto, a magnetizable body, such as a plate of iron, fixed to said shaft within the coil or conductor and at an angle with the shaft, an indicator and scale for indicating the rotatory movements of the shaft, and a spring or gravity control for opposing the movements and restoring the indicator to zero when no current traverses the coil or conductor.

In witness whereof I have hereunto set my hand this 23d day of April, 1895.

ELIHU THOMSON.

Witnesses:
 JOHN W. GIBBONEY,
 HENRY O. WESTENDARP.